March 16, 1943.     C. S. MAURER     2,314,011
SCALE INTEGRATING MECHANISM
Filed July 19, 1941     2 Sheets-Sheet 1
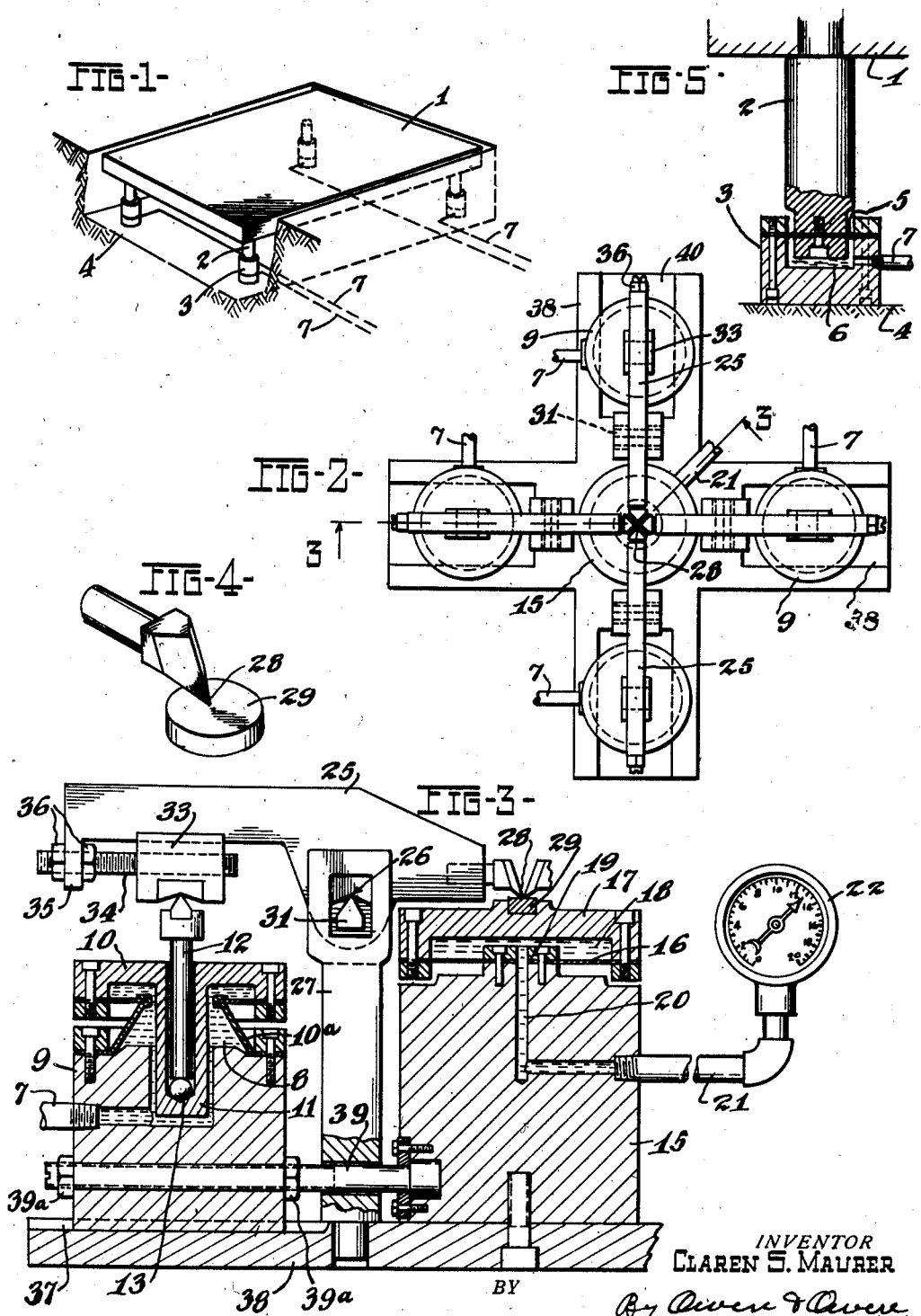
INVENTOR
CLAREN S. MAURER
BY
ATTORNEYS March 16, 1943. C. S. MAURER 2,314,011
SCALE INTEGRATING MECHANISM
Filed July 19, 1941 2 Sheets-Sheet 2
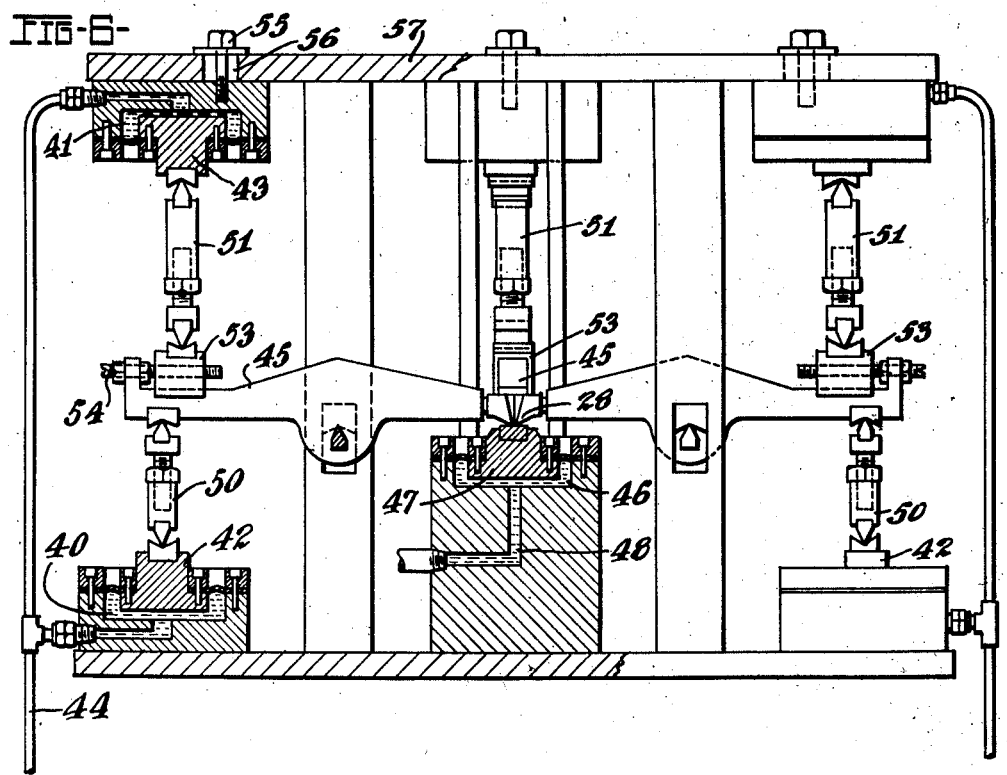
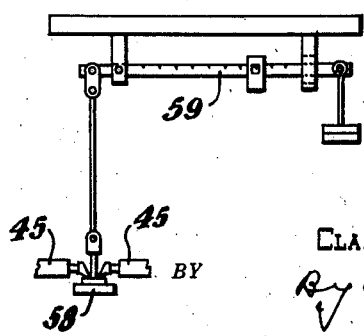
INVENTOR
CLAREN S. MAURER
BY
ATTORNEYS Patented Mar. 16, 1943

2,314,011

UNITED STATES PATENT OFFICE 2,314,011

SCALE INTEGRATING MECHANISM

Claren S. Maurer, Toledo, Ohio

Application July 19, 1941, Serial No. 403,145

5 Claims. (Cl. 265—47)

This invention relates to scale integrating means of the hydraulic type, wherein the weight of an object placed on the scale platform is accurately communicated through a plurality of supports to a single weight indicator irrespective of the position of the object on the platform.

The object of the invention is the provision of an integrating apparatus in which variations and inaccuracies of the platform supporting elements and other scale parts due to variations in machining and variations in the reaction produced by a given load may be compensated for.

Another object of the invention is the provision of a simple and efficient adjusting means for an integrating apparatus for a hydraulic scale.

The invention is fully described in the following specification, and illustrated in the accompanying drawings, in which Figure 1 is a perspective view of a platform having a multiple point hydraulic pressure support in accordance with the invention; Fig. 2 is a plan view of the hydraulic pressure integrating means of the invention; Fig. 3 is an enlarged sectional detail on the line 3—3 in Fig. 2, together with an associated pressure indicating gauge; Fig. 4 is a perspective detail of the point contact feature of each pressure lever with the responsive part of the device; Fig. 5 is an enlarged sectional detail of one of the hydraulic supporting members of the scale platform; Fig. 6 is a central vertical section, with parts in full, of a modified form of the pressure integrating means shown in Figs. 2 and 3, and Fig. 7 is a modification showing the application of the integrating pressure means to a scale beam.

Referring to the drawings, 1 designates a scale platform supported by a plurality of plungers 2, four in the present instance, arranged in spaced relation and preferably at or adjacent to the various corners of the platform, if of rectangular form, as indicated in Fig. 1. Each plunger for purpose of illustration is shown in the present instance as working through a stationary cylinder 3 mounted on any suitable support 4, with the plunger acting against a diaphragm 5 (Fig. 5), which shuts off the top of a pressure fluid chamber 6 in the cylinder. Each chamber 6, which may be termed a primary pressure chamber, is connected through a respective line 7 with a respective chamber 8 in one of a set of cylinder blocks 9 corresponding in number to the cylinders 3.

Each chamber 8, which may be termed a secondary pressure chamber, in the present instance is closed at its top by a plunger 10 having a flexible diaphragm connection 10a with the top of the cylinder block 9 and also having a bottom extension 11 projecting down into the chamber 8 with a free space therearound, as shown. The extension 11 is centrally bored to near its bottom with its top open through the diaphragm, and a thrust rod 12 projects down into such bore free from contact with its side wall and has a pedestal bearing at its bottom, in the present instance, on a ball 13, which is placed well below the diaphragm 10 for the purpose hereinafter described.

The several cylinder blocks 9 are preferably, but not necessarily, arranged in substantially equidistantly spaced relation around a central block 15 having a diaphragm 16 centrally mounted thereon. A top 17 of inverted cup-form is marginally mounted on the diaphragm 16 and cooperates therewith to form a pressure chamber 18. A passage 20 in the block 15 and connection 21 lead to a pressure indicating gauge 22 reading in units and fractions of pounds.

Pressure is communicated from each pressure actuated plunger 10 and its thrust rod 12 centrally to the movable top 17 of the master chamber 18 through a respective lever 25. This lever has an upward fulcrum thrust at 26 against a bearing in a respective post 27 and has its outer arm projecting over and receiving the upward thrust of the respective thrust rod 12, while its inner end has a downward thrust point bearing against the top 17 of the master chamber 18. Such inner end thrust is through a point part 28 against a suitable hardened bearing part 29 on the top 17, and the thrusts of the several point parts 28 are closely around a center point of the top.

For the purpose of the fulcrum 26, the upper end of each post 27 is forked to receive the lever 25 which has a cross-pin 31 projecting into openings in the fork arms and in knife edge bearing coaction with hardened seats in the openings of the post 27.

The upward knife edge thrust of each rod 12 is against a hardened insert in a thrust block 33 on the respective lever 25. This block is slidingly mounted against the under side of the lever for adjustment lengthwise thereof. Such adjustment is effected by a screw rod 34 threaded through the block and anchored to a lip 35 on the lever by nuts 36. These nuts may be tightened against the lip to lock the rod in adjusted position and may be loosened to permit turning of the rod for adjustment of the block 33.

Each cylinder block 9 is also preferably mounted for radial adjustment relative to the center block 15. To accomplish this, each block 9 is mounted in a respective radial groove 37 in the top surface of a base plate 38 carrying the several blocks 9, the center block 15 and the fulcrum posts 27. In addition, an adjusting rod 39 is provided for each block 9, being anchored at its inner end to the center block 15 (Fig. 3), and thence projecting outward through the respective post 27 and block 9 and having adjusting nuts 39a threaded thereon at the inner and outer sides of the block. It is thus apparent that a loosening of one of such nuts and a tightening of the other will effect a desired inward or outward adjustment of the block on the base plate 38.

The adjustments of the blocks 9 and lever thrust blocks 33 is important as it enables the points of application of force to the different levers from the respective plungers 10 to be varied to compensate for errors in the effective diameters of the cylinder chambers 6, 8 and 18 as well as fluctuations in the pipe resistance and various other things which might tend to upset correct reading.

It is also important to have the pedestal support for each thrust rod 12 well down in the counter-bored extension 11 of each plunger 10, so as to minimize the difficulty which might otherwise occur from misalignment of the lever engaging end of the rod 12 relative to the plunger axis.

Figure 6 shows a modification of the adjusting feature of the pressure integrating means. In this form, the adjustment is effected by connecting each primary pressure chamber 6 to two secondary chambers 40, 41, the pressure actuated plungers 42, 43 of which are in opposed thrust connection with a respective pressure lever 45 at spaced points lengthwise of its power arm with at least one of such points adjustable to vary the applied force. The connection between the chamber 6 and associated chambers 40 and 41 is through a pipe 44. The lever 45 corresponds in function to the lever 25 of the form first described and pressure applied thereto is communicated to the fluid in the master chamber 46 through the plunger 47 and thence to the indicator 22 through the passage 48.

Pressure is communicated from the plunger 42 of the chamber 40 to the under side of the power arm of the lever 45 near its outer end through a thrust rod 50, while pressure at the same time is communicated from the plunger 43 of the chamber 41 through a thrust road 51 which bears at its lower end against a hardened seat carried in a block 53 slidingly mounted on the top side of such power arm for adjustment lengthwise thereof. Such adjustment is effected by a screw 54. The thrust rods 50 and 51 are preferably adjustable as to length, as shown, and each has knife edge contact at its ends with the hardened seats of its respective parts. The line of thrust of the upper rod 51 against the lever is within the line of thrust of the lower rod 50 against the lever relative to the lever fulcrum, so that the resultant power arm of the lever with respect to the upper is shorter than the resultant power arm of the lever with respect to the lower. Therefore, the pressure applied to the two plungers 42, 43 through the common supply line 44 being equal, the effective operating pressure applied through the lever is equal to the difference in the turning moments of the forces exerted by the two plungers 42, 43. This difference can be nicely adjusted by an adjustment of the block 53 on the lever. The carrying screw 55 for the block of the chamber 41 projects through a slot 56 in the frame 57 to permit adjustment of the cylinder to compensate for that of the adjustment of block 53.

The modification in Fig. 7 shows the several pressure communicating levers 45 of Fig. 6 as acting downward against a common master member 58 suspended from a scale beam 59, so that the force of the pressure applied to the scale platform 1 may be determined by the movement of the weight along the beam or by the application of weight thereto in a manner well understood in the art.

In the use of the invention, particularly as disclosed in Figs. 1 to 5, the weight of an object applied to the platform 1 will be distributed through the several associated primary pressure chambers 6 to the respective secondary chambers 8 and the sum of the pressure applied to the plungers 10 of the latter will accurately determine the weight of the article irrespective of the position of the article on the scale platform. To accomplish this, each chamber 8 of the integrating means has its applied pressure communicated to a master pressure chamber 18 through a plurality of levers 25 acting against the plunger 17 and the pressure in such chamber is the sum of the pressures applied to the several secondary chambers 8, this total pressure being indicated by the gauge 22. In the use of the form shown in Fig. 6, the result is the same except that the pressure applied to the fluid in the master chamber 46 is considerably less than that applied to the fluid in the master chamber 18 of the first described form, due to the differential opposing action of the pressure plungers 42, 43 on the respective levers of the integrating means. Errors in diameter of the primary chamber plungers, the secondary chamber plungers, master chamber plungers or the spacing of the fulcrums, etc., as well as fluctuations in the piping resistance, and various other things which might tend to upset correct reading, can be compensated for in the form shown in Figs. 1 to 5 by adjustment of the thrust block 33 of its associated secondary cylinder block 9, and in the form shown in Fig. 6 by adjustment of the block 53 of the associated secondary chamber 41 lengthwise of the lever.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a weighing apparatus having a load supporting element and a hydraulic supporting means therefor including a plurality of primary pressure chambers with element supporting members movable therein to vary the pressure in the chambers in accordance with the load applied to the element, a master pressure receiving member, means associated therewith and operable to indicate the sum of different pressures applied thereto, a plurality of levers separately acting on said master member to apply pressure thereto, means forming a pair of secondary pressure chambers for each primary chamber and connected therewith, a pair of thrust members operable by pressure in said secondary chambers to impart opposed thrusts against the power arm of a respective lever, one of said thrust members acting against the lever in closer relation to its fulcrum than the other thrust member whereby the lever operating thrust is opposed a predetermined extent by the other thrust member, and means for adjusting the point of connection of one of said thrust members with the lever lengthwise thereof.

2. In a weighing apparatus having a load supporting element and a hydraulic supporting means therefor including a plurality of primary pressure chambers with element supporting members movable to vary the pressures in the chambers in accordance with the load applied to the element, a frame, a secondary pressure means carried by the frame for each primary pressure chamber in communication therewith and having an element movable in response to pressure generated in the primary chamber, a movable master pressure member, means responsive to movements of said master member to indicate the sum of pressures applied thereto, a plurality of levers each connecting the movable element of one of said secondary means and said master member to transmit pressure from one to the other, means for adjusting the connection between each lever and the secondary movable element to shift the point of application of pressure to the lever lengthwise thereof, and means for adjusting the movable element of each secondary pressure means to compensate for an adjustment of its connection with its lever.

3. In a weighing apparatus having a load supporting element and a hydraulic supporting means therefor including a plurality of primary pressure chambers with element supporting members movable therein to vary the pressures in the chambers in accordance with the load applied to the element, a movable master element, means responsive to movements of said master element to indicate the sum of pressures applied thereto, a frame, a plurality of secondary cylinders mounted on the frame around said master element and corresponding in number to said primary pressure chambers, each cylinder having communication with a respective primary chamber and including a movable element responsive to pressure generated in such chamber, a plurality of levers fulcrumed around said master element with their inner ends engaging said master element and with the outer end of each lever vertically aligned with and extending transverse to the movable element of a respective secondary cylinder, a thrust block carried by and adjustable lengthwise of the power arm of each lever, a thrust part connecting each thrust block and the movable member of the respective cylinder whereby pressure communicated to such movable member is transmitted through the lever to said master element, said cylinders being adjustable on the frame to compensate for adjustment of the respective thrust block relative to its lever.

4. In a structure of the class described, a load supporting element and hydraulic supporting means therefor, including a primary pressure chamber, an element movable in said primary pressure chamber to vary the pressure therein in accordance with the load applied to the element, a pair of opposed secondary cylinders, both connected to said primary pressure chamber, a master pressure receiving member, a lever connected to said master member, a pair of opposed thrust members operable by pressure in said secondary cylinders to impart opposed thrusts against said lever, one of said thrust members acting against the lever in closer relation to its fulcrum than the other thrust member whereby the lever operating thrust is opposed to a predetermined extent by the other thrust member, and means for adjusting the point of connection of at least one of said thrust members with the lever lengthwise thereof.

5. In a structure of the class described, a load supporting element and a hydraulic supporting means therefor, including a primary pressure chamber with an element movable therein to vary the pressure in the chamber in accordance with the load applied to the element, a movable master member, means responsive to movements of the master member to indicate the pressure applied thereto, a frame, a secondary cylinder mounted on the frame and having a movable element therein, means establishing communication between said secondary cylinder and said primary chamber, a lever fulcrumed adjacent said master member with its inner end engaging said master member and with its outer end vertically aligned with and extending transverse to the movable element of said secondary cylinder, a thrust block carried by and adjustable lengthwise the power arm of said lever, a thrust part connecting said thrust block and the movable element of the secondary cylinder whereby pressure communicated to such movable element is transmitted through the lever to said master member, and means to adjust said secondary cylinder on the frame to compensate for adjustment of the thrust block relative to its lever.

CLAREN S. MAURER.